ially Patent [11] 3,615,328

| [72] | Inventor | James C. Coleman |
| | | Toledo, Ohio |
| [21] | Appl. No. | 793,257 |
| [22] | Filed | Jan. 23, 1969 |
| [45] | Patented | Oct. 26, 1971 |
| [73] | Assignee | Owens-Illinois, Inc. |

[54] ROTARY MOLDING METHOD OF PRESS SHAPING GLASS
9 Claims, 4 Drawing Figs.

[52] U.S. Cl. ..................................................... 65/72,
65/75, 65/83, 65/246, 65/251
[51] Int. Cl. ................................................ C03b 11/02
[50] Field of Search .......................................... 65/69, 72,
75, 76, 77, 83, 227, 246, 251, 307, 243, 320, 309, 310

[56] References Cited
UNITED STATES PATENTS
| 723,589 | 3/1903 | Duffield | 65/310 |
| 1,657,921 | 1/1928 | Glaspey | 65/309 |
| 2,009,994 | 2/1966 | Cramer | 65/309 |

*Primary Examiner*—Arthur D. Kellogg
*Attorneys*—E. J. Holler and Thomas A. Meehan

ABSTRACT: This application discloses alternative embodiments of a method for press-molding glass articles, e.g. television picture tube faceplates or other glass items of similar shape. The method employs incrementally indexing concentric tables, the inner table being a molding table with a first number of stations thereon, and the outer table being a cooling table with a second number of stations thereon. An article to be press molded is advanced with the molding table, in unison with a movable mold which is located at one of the stations thereof and an aligned reciprocatable plunger in molding contact therewith, for a number of single-step incremental steps of the table which is preselected to provide sufficient time for proper pressing of the article. After the predetermined number of incremental steps, the plunger is retracted and the mold and article therein are shifted, in unison, to a station on the cooling table, for double-step incremental advancement therewith until the article has had sufficient time, at the rotational cycle time of the cooling table, to cool to a temperature adequate for removal from the mold. Thereupon the article is removed from the mold, a fresh gob of glass to be molded is added to the mold, and the mold is moved back to a station on the molding table to begin a repeat of the cycle. In the meanwhile, the same cycle has been initiated with a number of other molds. The advantages of molding large glass articles by indexing the articles in their molds through concentric molding and cooling paths, which previously have been described in relationship to a molding path employing eight molding stations, can now be obtained in lower productivity methods, e.g. in six-station and in seven-station molding methods, and therefore with simpler and less expensive equipment, by advancing the molded article along the cooling path in double step increments rather than in single step increments.

PATENTED OCT 26 1971

PLUNGER

RING-SHELL

MOLD-NO GLASS

MOLD-WITH GLASS

*INVENTOR.*
JAMES C. COLEMAN
BY E. J. Holler &
Thomas A. Meehan
ATTORNEYS

3,615,328

ROTARY MOLDING METHOD OF PRESS SHAPING GLASS

BACKGROUND OF THE INVENTION

Heavy press molded glass articles, e.g. television picture tube faceplates, lighting globes, bowls, and similar items, are commonly press molded by means of a rotary press-molding machines having one circular indexing table which indexes successive molds, each with a glass gob to be molded therein, into a molding position beneath a single, reciprocatory, nonindexing plunger. Such an arrangement is, inherently, limited as to productivity by the length of time in which the plunger must be in contact with the article being molded for proper molding, as there is no provision for overlapping the molding cycles of successive articles.

According to the method suggested in copending U.S. Pat. application Ser. No. 760,038 filed by W. A. Stutske, and assigned to the assignee of this application, however, articles may be press molded at high productivity by a rotary press-molding machine while still providing for long periods of pressing time. Such result was obtained by the method disclosed therein by providing the molding table with a plurality of plungers which index in unison with the molding table, thereby allowing the press-molding cycle of a given article to start before pressing cycle of the preceding cycle has been completed. To satisfactorily achieve this result, however, it was also necessary to make provision for additional cycle time to allow the molded part to adequately cool in its mold before it is withdrawn therefrom, as the conventional molding technique described above utilizes the period of dwell of a molded article in its mold at several stations subsequent to the molding station to attain such cooling. In the Stutske invention, therefore, an additional indexing cooling table was provided concentrically surrounding the molding table, and means was provided to transfer successive article-containing molds from the molding table to the cooling table at the end of the pressing cycle for indexing with the cooling table through a number of stations adequate to achieve proper cooling. Additional means were, of course, also provided to transfer successive empty molds from the cooling table back to the molding table, after the cooled articles have been removed therefrom, for a repeat of the process. As suggested in the aforesaid Stutske case, when equipment of this type is provided, great flexibility as to production rate, pressing time and cooling time can be built into the press-molding operation by varying the number of molds in use, the relative of the mold transfer positions and the relative rotational directions of the molding and cooling tables.

In the method disclosed in the aforesaid Stutske application, the aforesaid advantages were obtained by a method employing eight molding stations. Such an eight-station method may, of course, be of a higher productivity than is needed in a particular instance and the equipment needed to practice such a method is large and costly. According to the present invention, the advantages of concentric-molding and cooling path-molding methods can be substantially obtained in the methods employing fewer molding stations, for example six or seven stations, by using a double-step rather than a single-step advancement of articles and their associated molds along the cooling path, thereby simplifying the method and the equipment needed to practice it.

Accordingly, it is an object of the present invention to provide an improved method for press molding a glass article. It is further object of the present invention to provide a method for successively press molding a plurality of glass articles in which the pressing of a given article is initiated before the pressing of the preceding article is terminated. It is yet a further object of the present invention to provide a method of pressing glass articles using concentric molding and cooling paths.

Further objects and a better understanding of the present invention will be apparent from the following description of the drawing, the detailed description of the invention and the claims.

DETAILED DESCRIPTION OF THE INVENTION

Figure 1:
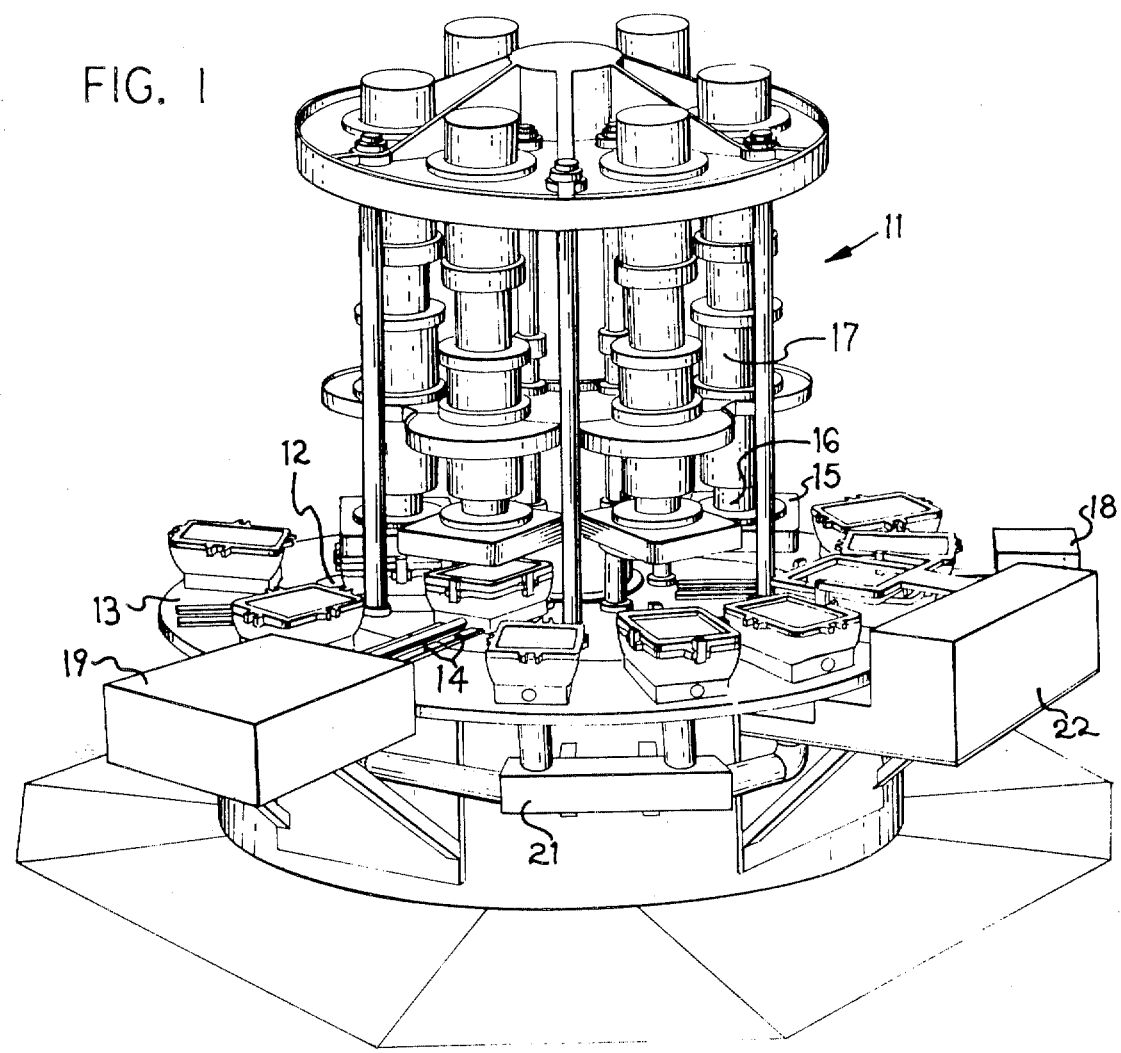
FIG. 1 is a perspective view of a rotary press-molding machine for practicing an embodiment of the press-molding method of the present invention.
Figure 3:
FIG. 3 is a legend identifying symbols used in FIG. 2.
Figure 3:
Figure 3:
Figure 3:
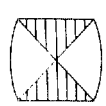

Equipment for practicing the method of the present invention is shown in FIG. 1 and comprises a rotary press-molding machine, generally indicated by numeral 11. Machine 11 comprises an inner circular molding table 12 with a plurality (shown as six) of stations located thereon at arcuately evenly spaced intervals (60° for an six-station table) and equidistant from the center of rotation of the table. Rotary-molding machine 11 further comprises a circular cooling table 13 concentrically surrounding molding table 12 and having a plurality of stations (shown as nine) located hereon at arcuately evenly spaced intervals (40° for a nine-station table) and equidistant from the center of rotation of the table. Located at each molding table station and at each cooling table station is radially extending track means 14, shown as comprising a pair of spaced parallel tracks, with the track means of each molding table station being aligned with the track means of a corresponding cooling table station to permit the transfer of an article mold at a station of a given table to the corresponding station of the other table along such track, at a time, for a purpose and in a manner which will be subsequently discussed in greater detail.

Molding table further comprises a molding plunger 15 located above each molding table station. Each plunger is attached to the lower end of the cylinder rod 16 extending from the lower end of a vertically extending hydraulic cylinder 17. Consequently, each plunger may be reciprocated between a lower position, in pressing relationship with molten glass in a mold at the station therebeneath, and an upper or retracted nonpressing position by the withdrawal of high-pressure hydraulic fluid from the portion of cylinder 17 on the upper side of the piston thereof, to retract the plunger, and the subsequent introduction of fluid into such space to lower the plunger. The flow of hydraulic fluid is, of course, controlled in a conventional and well understood manner by valve devices (not shown) which may be actuated manually or, preferably, automatically by conventional devices, e.g. electromechanical switches, for initiating a given motion upon completion of another motion.

To obtain relatively continuous production from the equipment described thus far, molding table 12, together with hydraulic cylinders 17, plungers 15 and the structure therefor, is constructed for repeated movement in a circular path in incremental steps, and in operation molding table 12 is advanced or indexed in such incremental steps, with a dwell period between successive steps, preferably by mechanical means (not shown) such as a conventional geneva drive mechanism. In embodiment illustrated in FIG. 2, molding table 12 is advanced counterclockwise in single step or single-station increments (60° for an six-station table). Cooling table 13 is also constructed for repeated movement in a circular path in incremental steps and, in operation, cooling table is advanced in such incremental steps, with a dwell period between successive steps which is substantially simultaneous with the dwell period between successive advancing steps of the molding table. Again, the incremental advancing movement of the cooling table may be accomplished by conventional mechanical means (not shown) and in the embodiment illustrated in FIG. 2, the cooling table 15 indexed counterclockwise in double-station increments (80° for a nine-station table).

Figure 2:
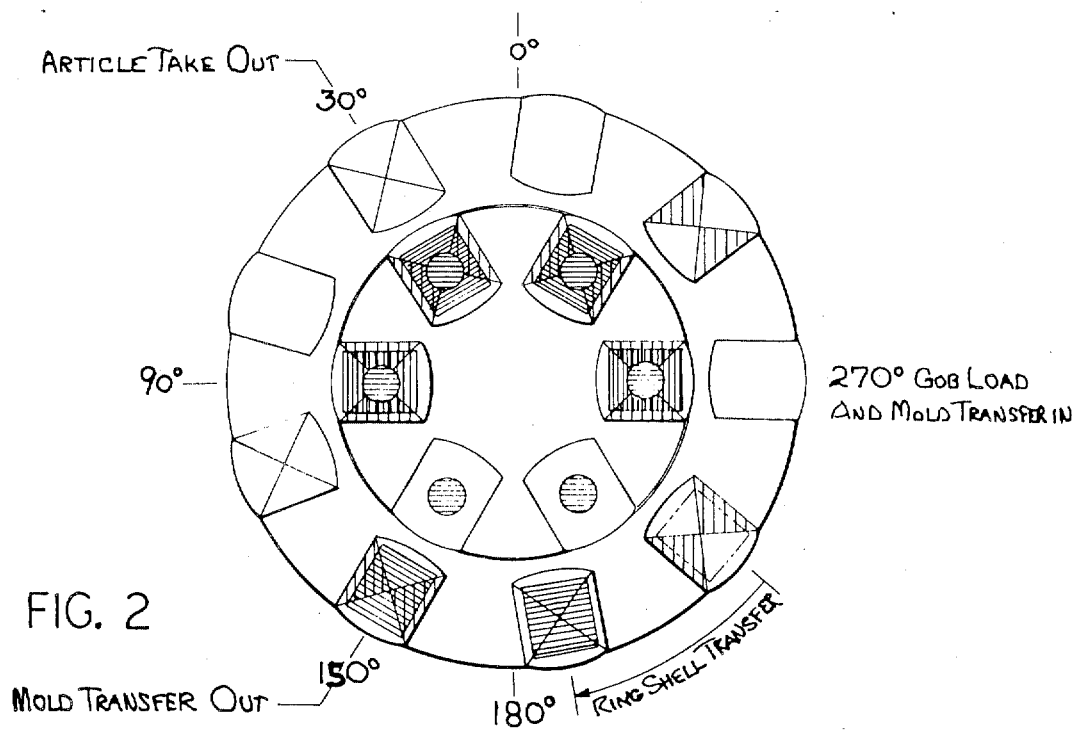
FIG. 2 is a schematic view illustrating the embodiment of a press-molding method according to the present invention, which method can be practiced with equipment of the type illustrated in FIG. 1.

To initiate the operation, a gob of glass to be molded is added to a mold on the cooling table at a position which may be considered to be at 270° in the schematic arrangements of FIG. 2. The gob is added while the molding and cooling tables are at rest and, during same rest period, the mold is transferred from the cooling table to the molding table by mold transfer device 18, shown schematically, and the plunger 15 and cylinder rod 16 of the hydraulic cylinder above the freshly loaded gob are actuated to move the plunger downwardly into position to press mold the gob in the mold therebelow into desired form. Also, during the same rest period, the plunger, is retracted from the mold at a mold table transfer-out station (shown as the 150° position) and the mold at the transfer-out station, with the molded article therein, is transferred to the cooling table by means of mold transfer device 19, shown schematically. After these steps have been performed, the mold table and the cooling table are each indexed by the predetermined incremental distances to bring an empty mold at the 190° cooling position into position adjacent the gob loading or mold transfer-in station, to advance one of the molds on the molding table, (at the 90° station) to the mold transfer-out station, to advance each of the other molds on the molding table one-station nearer to the mold transfer-out station, to advance an article-containing mold on the cooling table to a cooling table station where the article therein is removed therefrom, (from the 310° position to the 30° position) to advance the other articles containing molds at the 150°, 230° and 310° positions on the cooling table to the 230°, 310° and 30° positions, respectively, and to advance empty stations at the 270°, 350°, and 70° stations to the 350°, 70°, and 150° positions. The pressed article in its mold on the cooling table may be allowed to cool naturally by radiation and convention to ambient surroundings, or cooling may be accelerated by providing means such as a cooling air manifold 21 to forcibly cool the article, as by directing streams of cool air against the underside of the molds at the cooling table cooling stations.

In the molding of articles having a shape with a portion which tapers in a reverse direction from the major diameter, e.g. a TV tube faceplate many of which employ a sidewall which tapers inwardly from the viewing surface toward the free edge, the mold will, in known fashion, comprise a seperable member, popularly known as a "ring-shell" for forming the sidewall portion of such an article. In such a case ring-shell transfer means 22 are provided to transfer each such ring by 40° counterclockwise from the article containing at the 230° station to the empty mold at the 190° station. In the arrangement of FIG. 2, as above described, continuous production can be obtained using 10 molds and six ring-shells.

Figure 4:
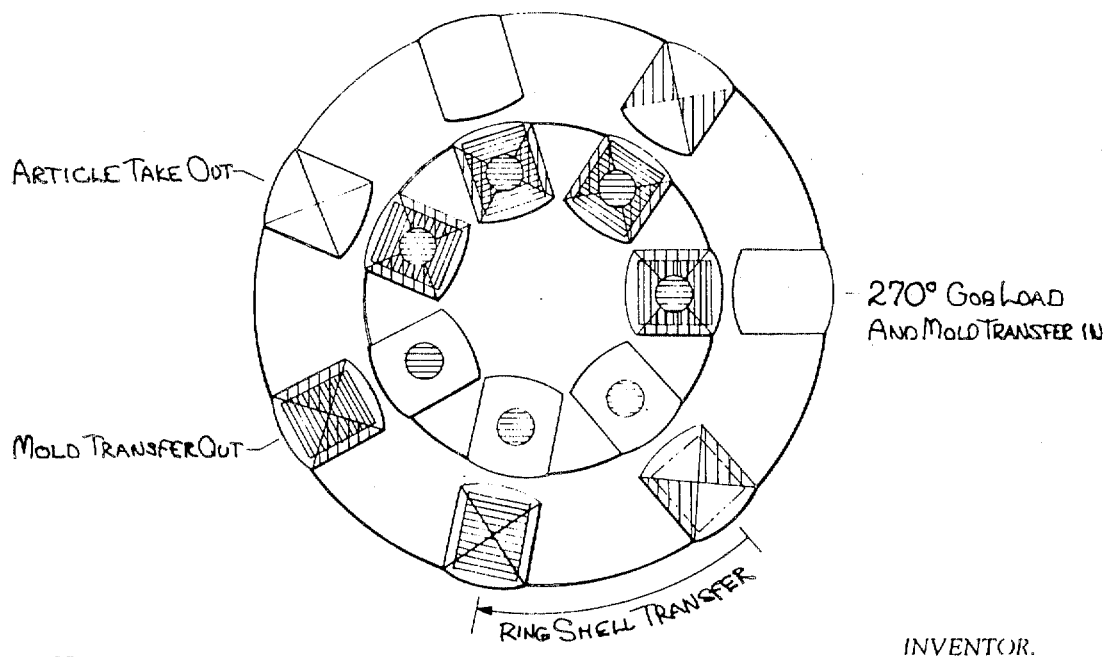
FIG. 4 is a schematic view similar to FIG. 2 illustrating an alternative embodiment of a press-molding method according to the present invention.

In the schematic arrangement of FIG. 4, the molding table is provided with seven stations evenly spaced at 51° 25+ 43'' intervals, each with vertically reciprocatable plunger thereabove, and the cooling table is also provided with seven evenly spaced stations, each radially aligned with a molding table station during the dwell portions of the molding cycle. To initiate the operation, a gob of glass to be molded is added to a mold on the cooling table at a position which may be considered to be at the 270° position. The gob is added while the molding and cooling tables are at rest and, during the same rest period, the mold is transfered from the cooling table to the molding table, and the plunger positioned above the freshly-loaded gob is actuated to move downwardly into position to press mold the gob in the mold therebelow into the desired form. Also, during the same rest period, the plunger is returned from the mold at a mold table transfer-out station (shown as the 115° 42' 52'' position) and the mold at the transfer-out station, with the molded article therein, is transferred to the cooling table. After these steps have been performed, the mold table is indexed counterclockwise in a single-step increment (51° 25' 43'') and the cooling table is indexed counterclockwise in a double step increment (102° 51' 26'') to bring an unloaded mold at the 167° 8' 35'' cooling position into position adjacent the gob-loading station, to advance one of the molds on the molding table, (at the 64° 17' 9'' station) to the mold transfer-out station, to advance each of the other molds on the molding table one station neared to the mold transfer-out station, and to advance an article-containing mold on the cooling table to a cooling table station where the article therein is removed therefrom, (from the 321° 25' 43'' position to the 64° 17' 9'' position). Again ring-shells may be employed and, in such case means are provided to transfer a ring-shell during dwell portion of the cycle from the mold at the 218° 35' 17'' position to the mold at the 167° 9' 34'' position. As described continuous production can be obtained in the FIG. 4 arrangement with nine molds and six ring-shells.

Tables I and II, below, list the operating characteristics of the arrangements of FIG. 2 and 4, respectively, for production rates, in pieces per minute, of four, five, six and eight. The pressing cycle is the period of time, in seconds, during which the plunger is in contact with the article in the mold. The cooling cycle is the period of time, in seconds, taken from the transfer of an article-containing mold from the molding table to the cooling table until the article is removed therefrom, assuming instantaneous mold transfer and instantaneous article removal at the same instant during each dwell cycle. The total cycle is the time in seconds, taken by each mold as it is indexed from the gob-loading station through the various molding table and cooling table stations back to the gob-loading station. The difference between the total cycle and the sum of the pressing and cooling cycles is the time during which each mold is empty, as it is being returned to the gob-loading station after an article has been removed therefrom.

TABLE I

| Pieces Per Min. | Pressing Cycle (sec.) | Cooling Cycle (sec.) | Total Cycle (sec.) |
| --- | --- | --- | --- |
| 4 | 55 | 50 | 150 |
| 5 | 45 | 39 | 120 |
| 6 | 36 | 34 | 100 |
| 8 | 25.5 | 25 | 75 |

TABLE II

| Pieces Per Min. | Pressing Cycle (sec.) | Cooling Cycle (sec.) | Total Cycle (sec.) |
| --- | --- | --- | --- |
| 4 | 55 | 50 | 135 |
| 5 | 44 | 40 | 108 |
| 6 | 36 | 34 | 90 |
| 8 | 265 | 26 | 67.5 |

While the invention has been described with reference to specific methods which may be practiced with particular embodiments of equipment, it is to be understood that other methods can be practiced with other equipment arrangements, without departing from the spirit of the invention or from the scope of the claims.

We claim:

1. The method of pressing glass parts by means of a horizontally orientated molding table which has a circular series of arcuately evenly spaced stations and a complemental series of vertically reciprocatable mold plungers, each of which is reciprocatable into and out of the press-molding engagement with a mold located at a molding station, and a cooling table concentrically surrounding the molding table and comprising a circular series of arcuately evenly spaced stations, said method comprising the steps of:

loading a gob of glass to be molded into an empty mold at a mold-loading station on the cooling table to be press molded, such loading being done while said mold is on the cooling table;

removing a pressed article from the mold while the mold is still on the cooling table after it has cooled in the mold for a finite period of time to a temperature adequate to permit the article to be removed from the mold.

transferring the gob-containing mold to the molding table from the mold-loading station on the cooling table with the tables as rest and with the mold plunger at such mold-loading station in an elevated, nonmolding position;

downwardly moving the molding plunger at the molding table station having the mold with the freshly loaded gob into press-molding engagement with the gob in the mold;

intermittently indexing the molding table in successive incremental angular steps equal to 360° divided by the number of molding table stations to concurrently advance a mold with its associated plunger in molding position from the mold transfer-in station to a mold transfer-out station and to allow the plunger to remain in molding contact with the gob in the mold for a sufficient time to allow for proper pressing of an article;

retracting the plunger from the molding contact with the mold and the molded article therein at the mold transfer-out station and transferring the mold and the article therein from the molding table to an adjacent station on the cooling table;

intermittently indexing the cooling table in the same direction as the molding table in successive incremental angular steps equal to 720° divided by the number of cooling table stations to permit a molded article to cool in its mold and to advance such mold from position on the cooling table corresponding to the mold transfer-out station to a position corresponding to the mold transfer-in station; and 2. The method of pressing a plurality of glass parts by a plurality of molds according to claim 1 wherein the molding and cooling tables are maintained in a stationary position for a predetermined time interval following each incremental advance, wherein the time intervals are substantially simultaneous, wherein a mold with a freshly loaded gob is transferred from the cooling table to the molding table during each such time interval and wherein another mold with a molded article therein is transferred from the molding table to the cooling table during each such time interval.

3. The method according to claim 1 wherein the molding table comprises six stations and the cooling table comprises nine stations.

4. The method according to claim 1 wherein the molding table comprises seven stations and the cooling table comprises seven stations.

5. the method according to claim 2 wherein the molding table comprises six stations and the cooling table comprises nine stations.

6. The method according to claim 4 wherein the molding table comprises seven stations and the cooling table comprises seven stations.

7. The method according to claim 3 wherein the mold is transferred from the molding table to the cooling table at the end of the fourth incremental advance after the mold has been loaded.

8. The method according to claim 4 wherein the mold is transferred from the molding table to the cooling table at the end of the fourth incremental advance after the mold has been loaded.

9. The method according to claim 2 wherein the article being molded is a TV faceplate, wherein a ring-shell separable from a mold is employed with each mold to assist in molding of the perimetrical wall of the faceplate, and wherein a ring-shell is transferred during each such time interval from a mold at the cooling table station which is one station upstream of the gob-loading station to the mold which is two stations upstream of the gob-loading station.